United States Patent
Altman

(10) Patent No.: US 9,818,095 B2
(45) Date of Patent: Nov. 14, 2017

(54) TAXI PAYMENT SYSTEM

(71) Applicant: VERIFONE, INC., San Jose, CA (US)

(72) Inventor: Mark Altman, Long Island City, NY (US)

(73) Assignee: VeriFone, Inc., San Jose, CA (US)

(*) Notice: Subject to any disclaimer, the term of this patent is extended or adjusted under 35 U.S.C. 154(b) by 269 days.

(21) Appl. No.: 14/347,312

(22) PCT Filed: Oct. 10, 2012

(86) PCT No.: PCT/US2012/059496
§ 371 (c)(1),
(2) Date: Mar. 26, 2014

(87) PCT Pub. No.: WO2013/055758
PCT Pub. Date: Apr. 18, 2013

(65) Prior Publication Data
US 2014/0244410 A1    Aug. 28, 2014

Related U.S. Application Data

(60) Provisional application No. 61/547,262, filed on Oct. 14, 2011.

(51) Int. Cl.
G06Q 20/00 (2012.01)
G06Q 20/20 (2012.01)
B60R 11/00 (2006.01)
G07B 13/02 (2006.01)

(52) U.S. Cl.
CPC ............. *G06Q 20/20* (2013.01); *B60R 11/00* (2013.01); *G07B 13/02* (2013.01); *B60R 2011/0085* (2013.01)

(58) Field of Classification Search
None
See application file for complete search history.

(56) References Cited

U.S. PATENT DOCUMENTS

| 4,836,486 | A  | * | 6/1989  | Vossoughi et al. ...... 248/281.11 |
| 5,678,741 | A  | * | 10/1997 | Schieber ..................... 224/275 |
| 5,918,841 | A  | * | 7/1999  | Sweere et al. ........... 248/123.11 |
| 6,231,017 | B1 | * | 5/2001  | Watkins .................... 248/274.1 |
| 6,289,315 | B1 | * | 9/2001  | Calvi .............................. 705/13 |
| 6,502,900 | B1 | * | 1/2003  | Johnston ................. 297/188.06 |
| 6,513,691 | B1 |   | 2/2003  | Edgerly |
| 6,554,357 | B2 |   | 4/2003  | Moffa |

(Continued)

FOREIGN PATENT DOCUMENTS

| FR | 2639198 A2 | 5/1990 |
| WO | 2013/055758 A1 | 4/2013 |

OTHER PUBLICATIONS

U.S. Appl. No. 61/547,262, filed Oct. 14, 2011.

(Continued)

*Primary Examiner* — Fateh M Obaid
(74) *Attorney, Agent, or Firm* — Hunton & Williams LLP

(57) ABSTRACT

A taxi payment system including a point of sale device and a mounting assembly for mounting the point of sale device inside a taxi, the mounting assembly having at least two operative orientations, a first operative orientation in which the point of sale device is accessible to a taxi passenger and a second operative orientation in which the point of sale device is accessible to a taxi driver.

20 Claims, 14 Drawing Sheets

(56) References Cited

U.S. PATENT DOCUMENTS

| | | | |
|---|---|---|---|
| 6,586,071 B1 | 7/2003 | Hanes | |
| 7,070,237 B2 | 7/2006 | Rochel | |
| 7,073,765 B2* | 7/2006 | Newkirk | 248/647 |
| 7,111,814 B1* | 9/2006 | Newman | 248/274.1 |
| 7,735,266 B2* | 6/2010 | Gallant et al. | 52/36.4 |
| 7,784,864 B2* | 8/2010 | Feder | 297/188.06 |
| 7,963,597 B2* | 6/2011 | Bostrom et al. | 297/188.04 |
| 2002/0175254 A1* | 11/2002 | Lee | 248/289.11 |
| 2003/0068988 A1* | 4/2003 | Janninck et al. | 455/90 |
| 2004/0032541 A1* | 2/2004 | Rochel | 348/825 |
| 2004/0267618 A1* | 12/2004 | Judicibus et al. | 705/16 |
| 2006/0022970 A1* | 2/2006 | Lum | 345/211 |
| 2006/0065724 A1* | 3/2006 | Lum | 235/383 |
| 2010/0243724 A1 | 9/2010 | Golla | |

OTHER PUBLICATIONS

An International Search Report and a Written Opinion, both dated Jan. 7, 2013, which issued during the prosecution of Applicant's PCT/US2012/059496.

An International Preliminary Report on Patentability dated Apr. 15, 2014, which issued during the prosecution of Applicant's PCT/US2012/059496.

* cited by examiner

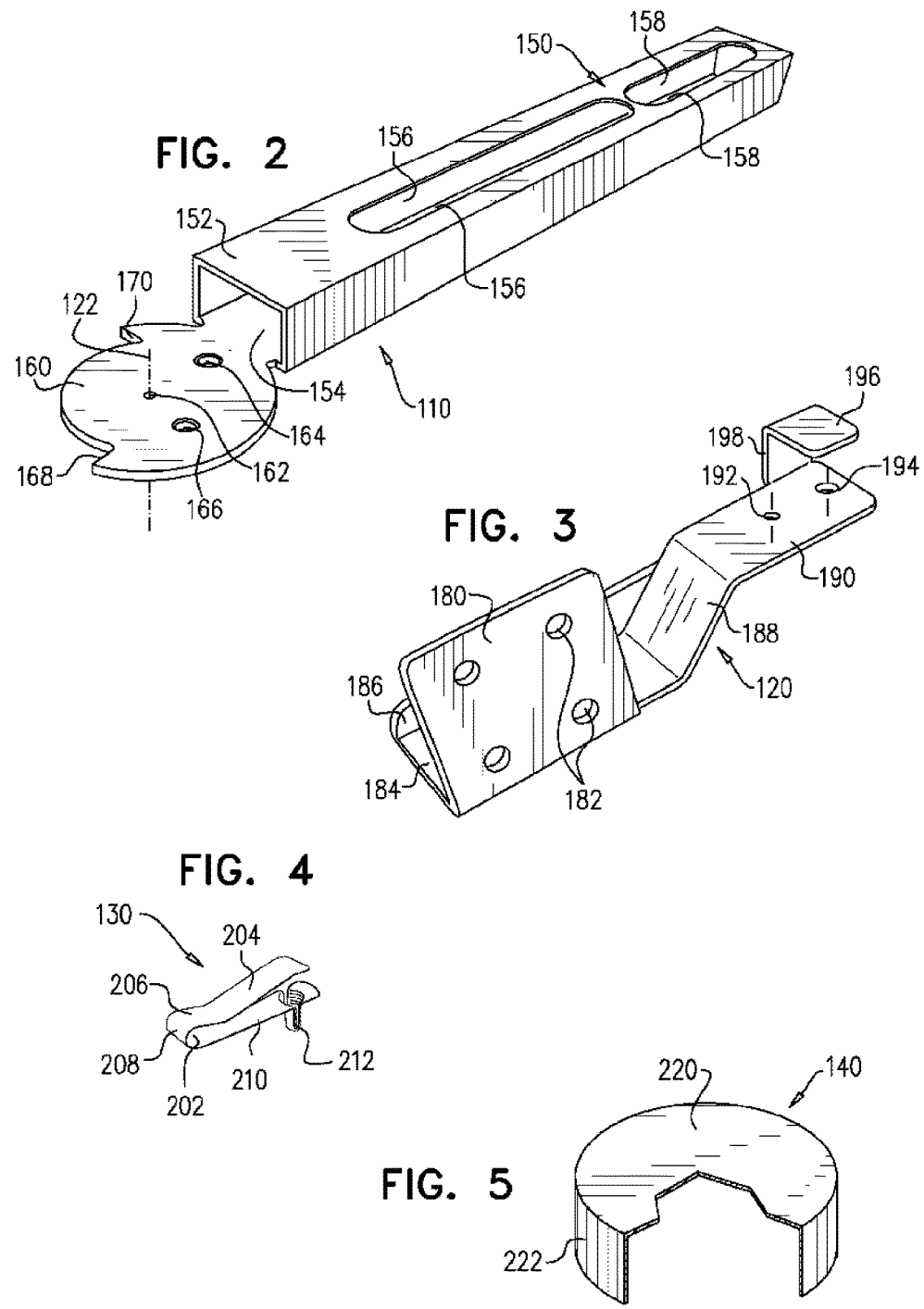

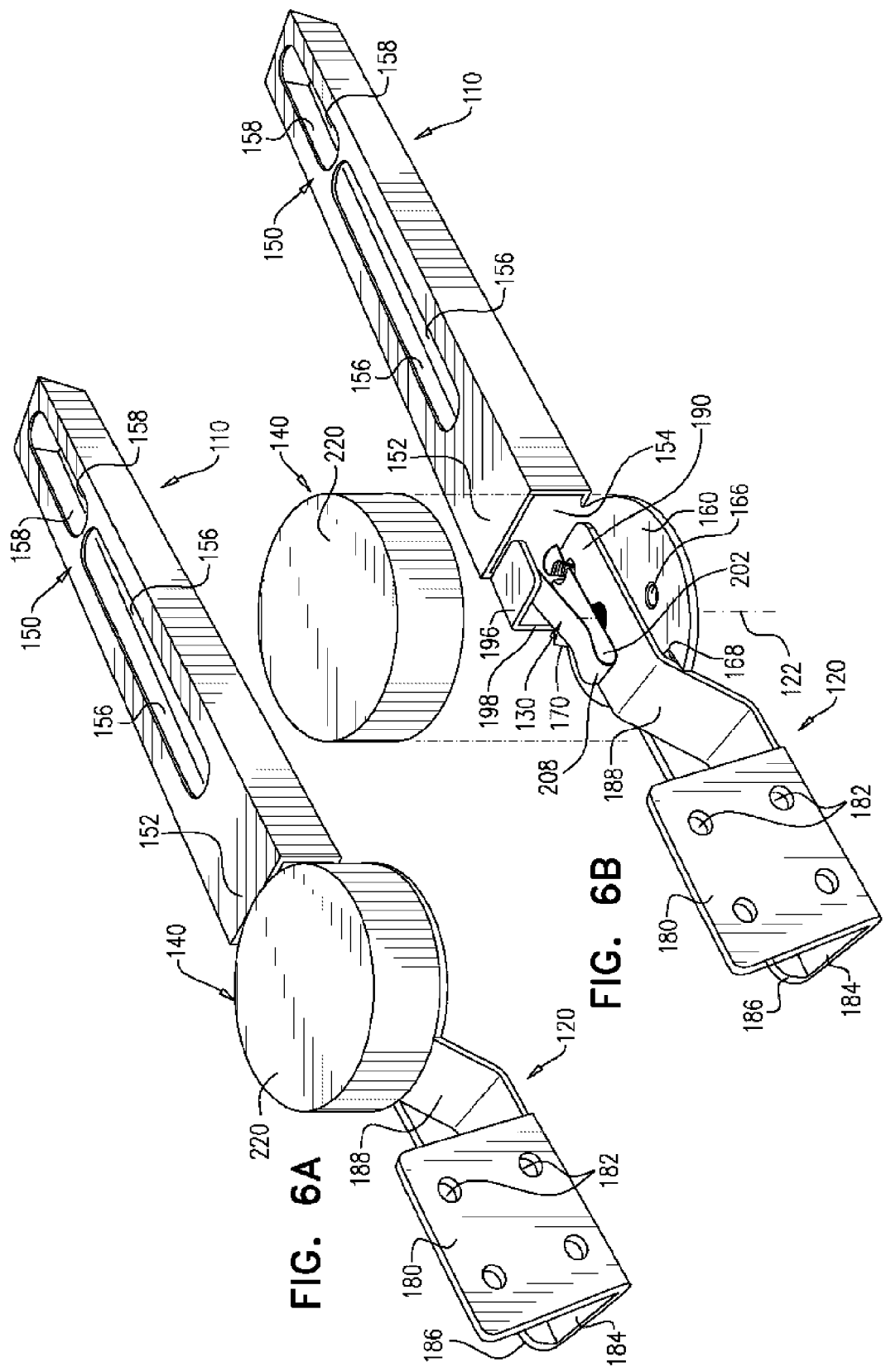

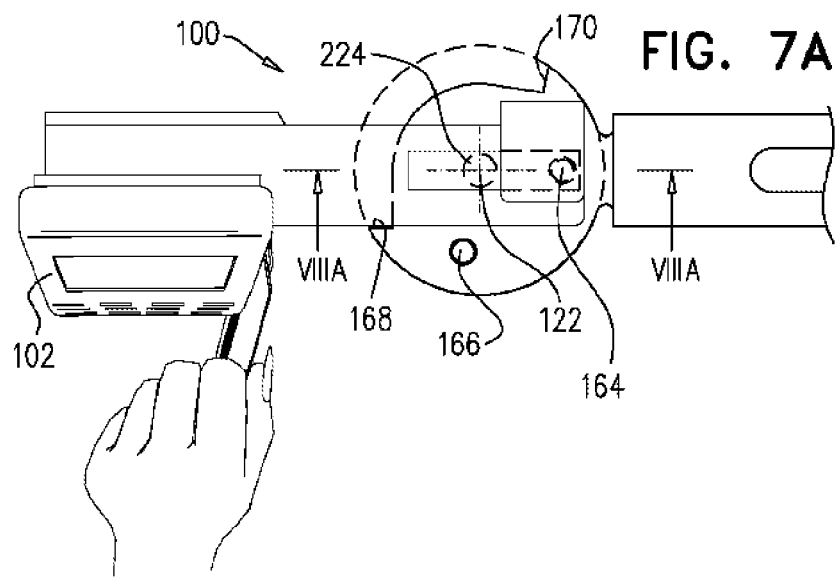
FIG. 7A
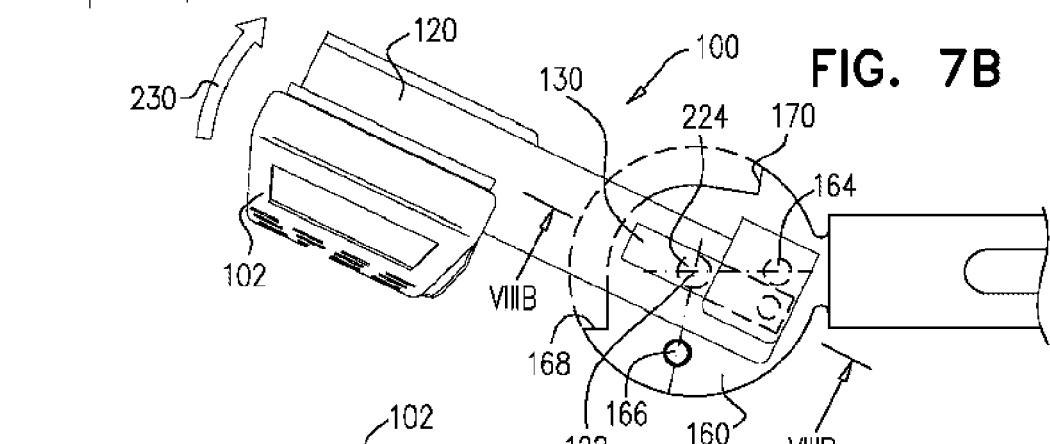
FIG. 7B
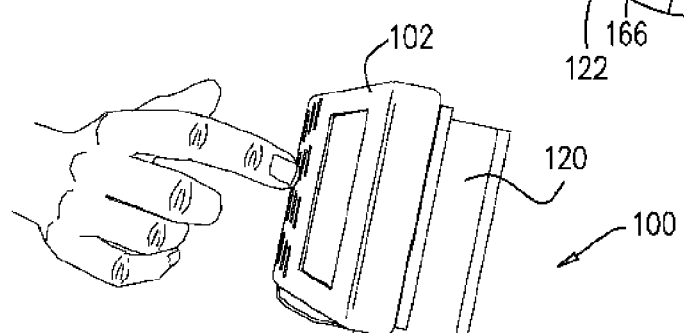
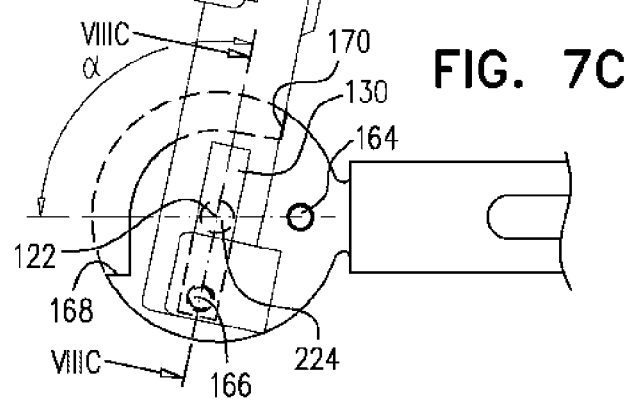
FIG. 7C

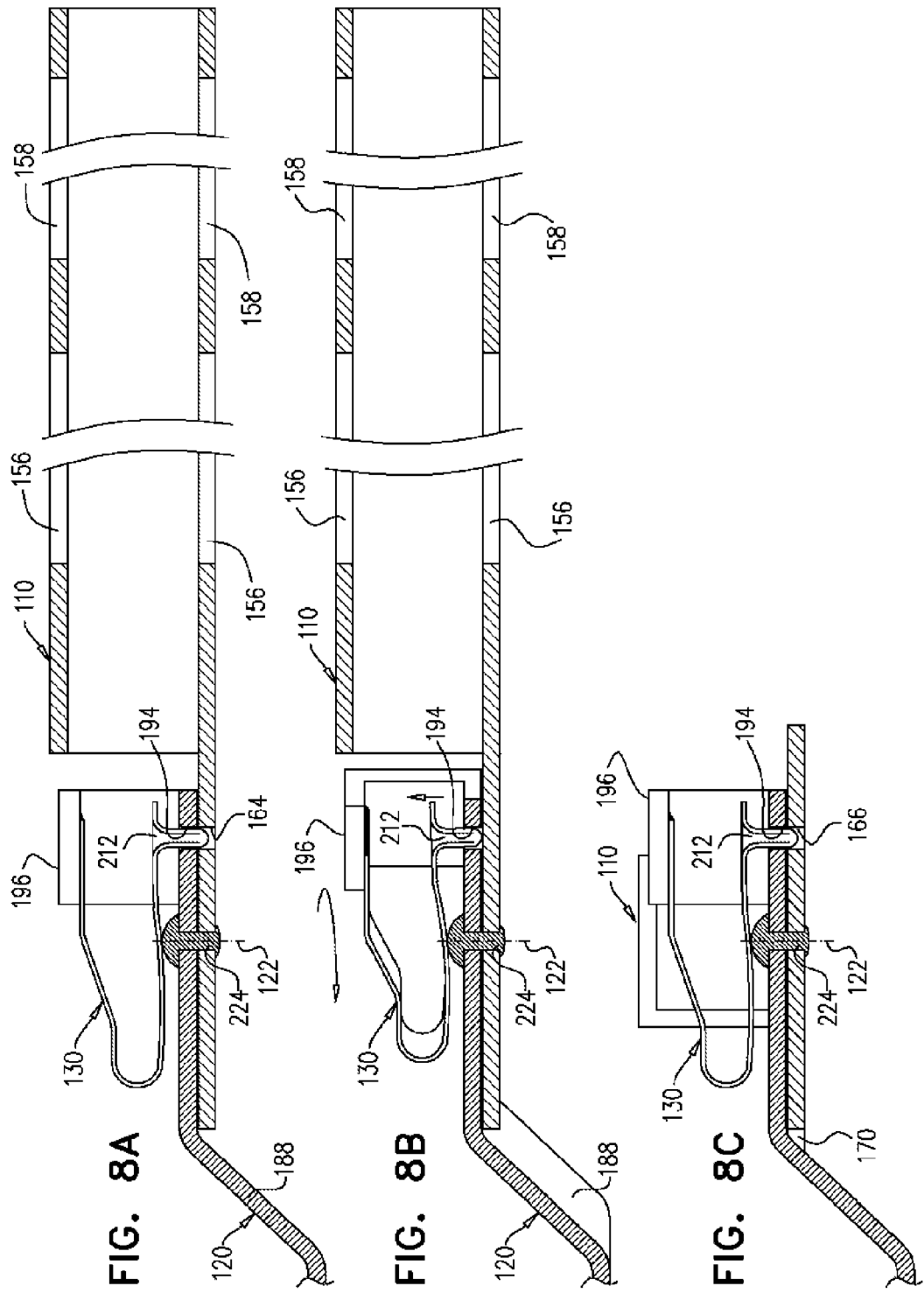

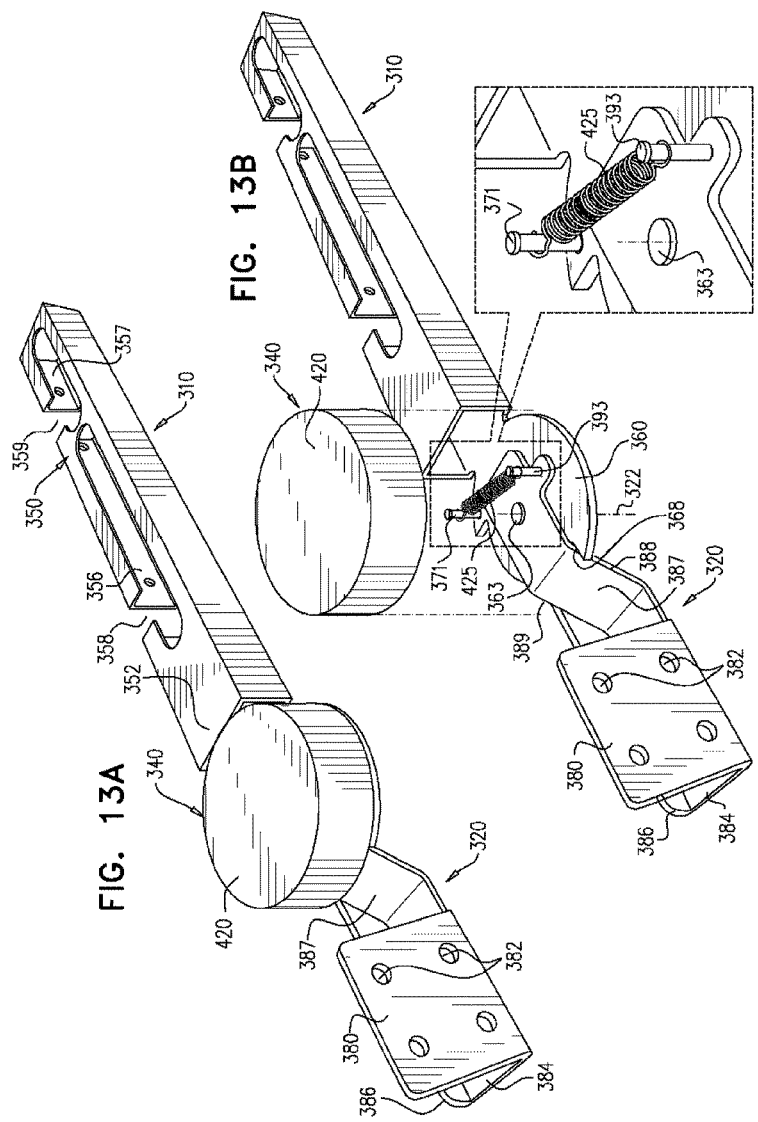

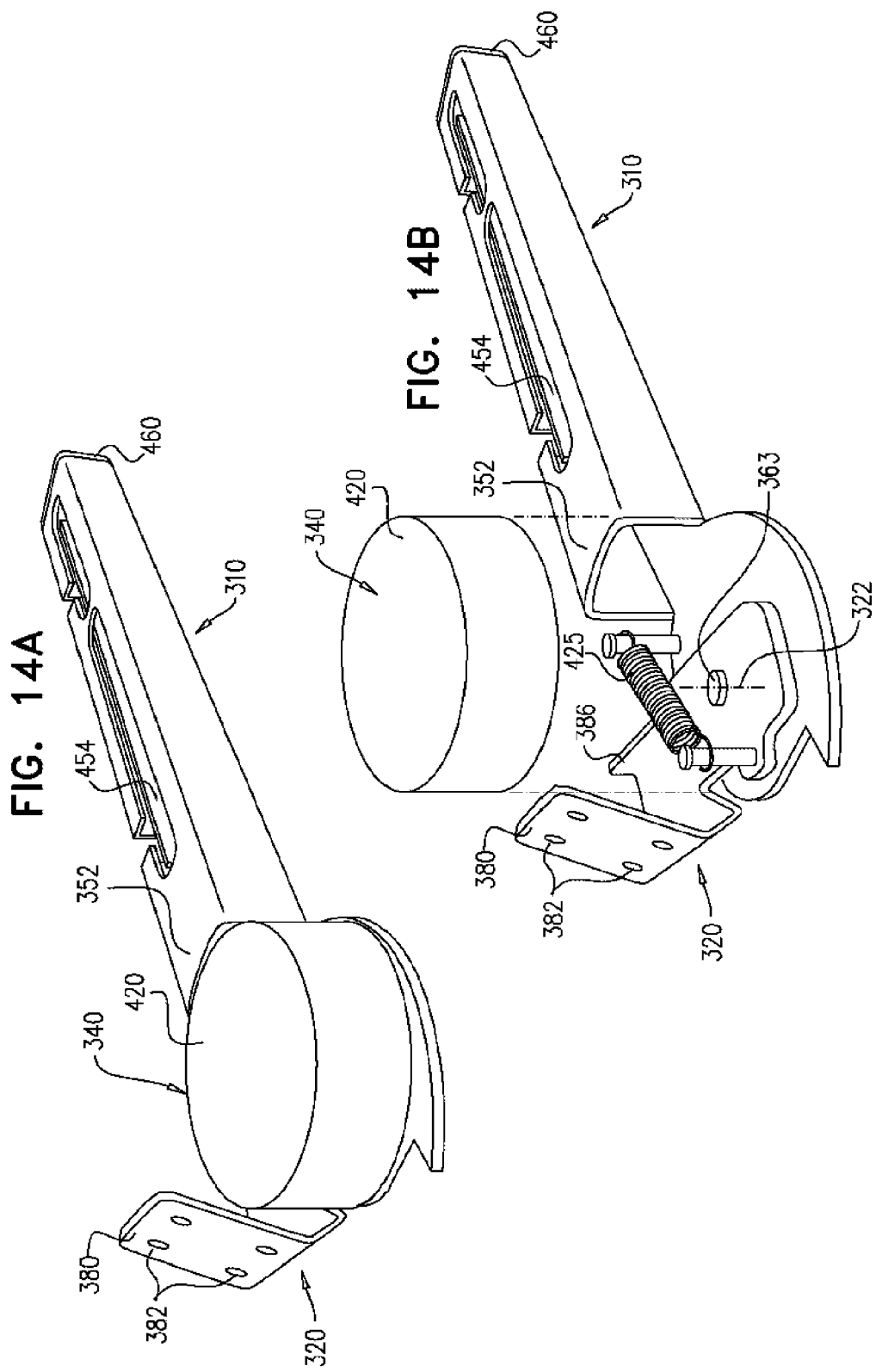

FIG. 15A
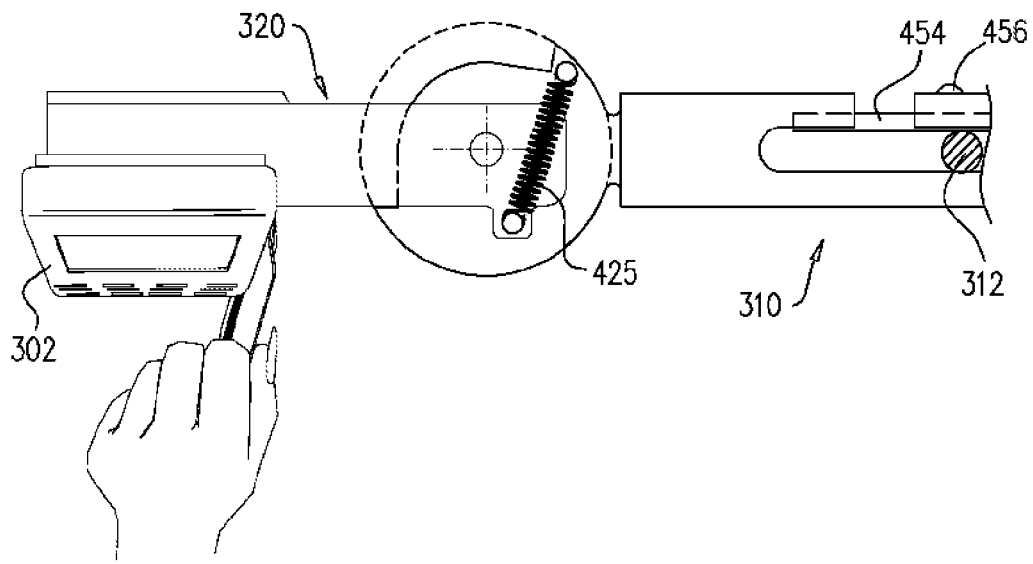
FIG. 15B
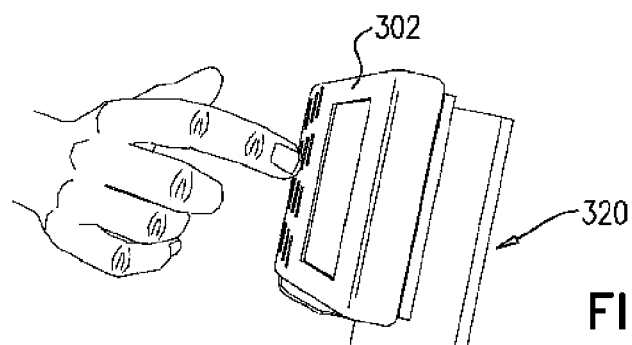
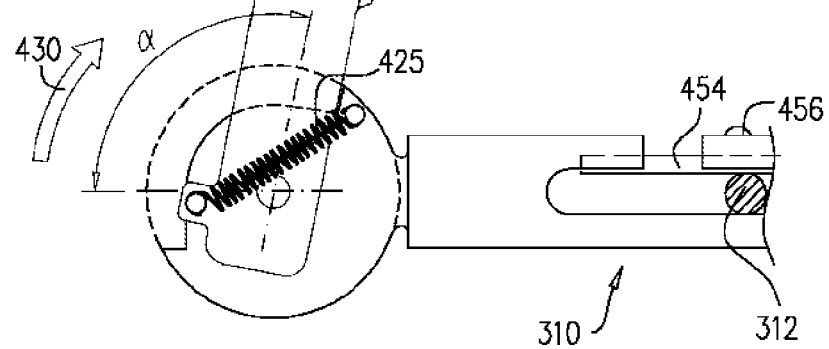

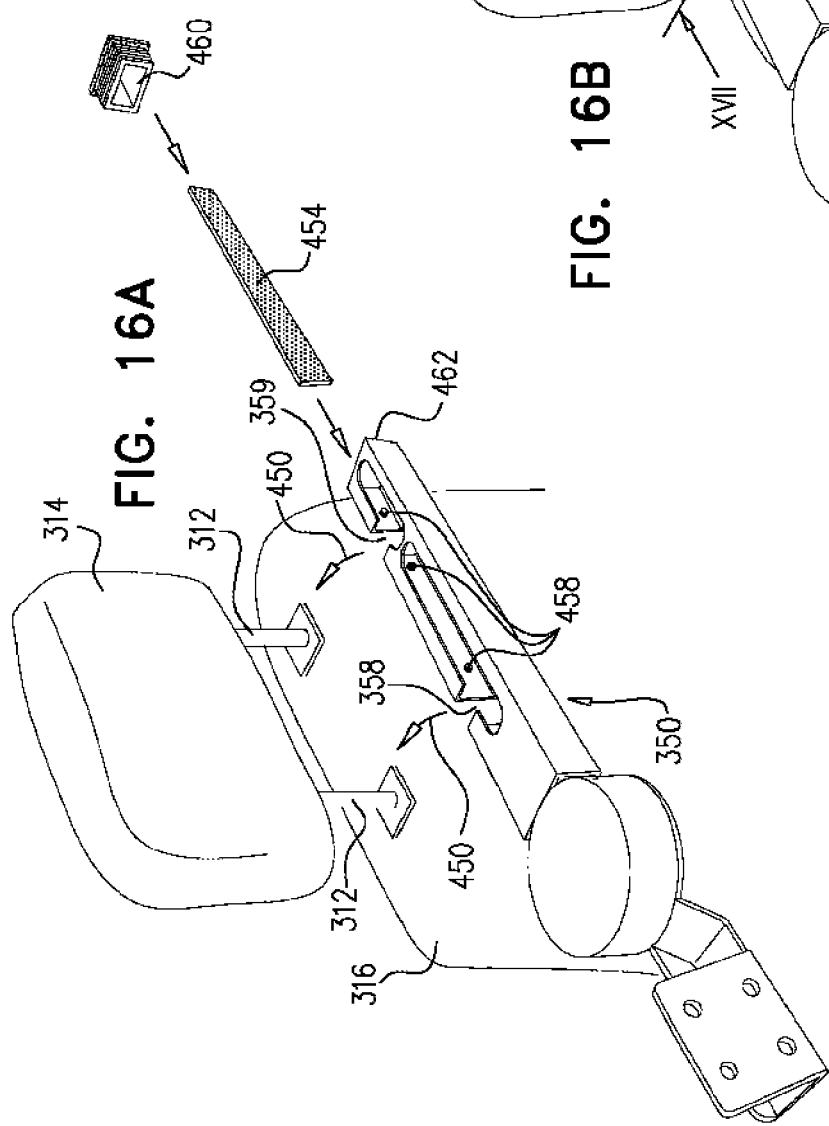
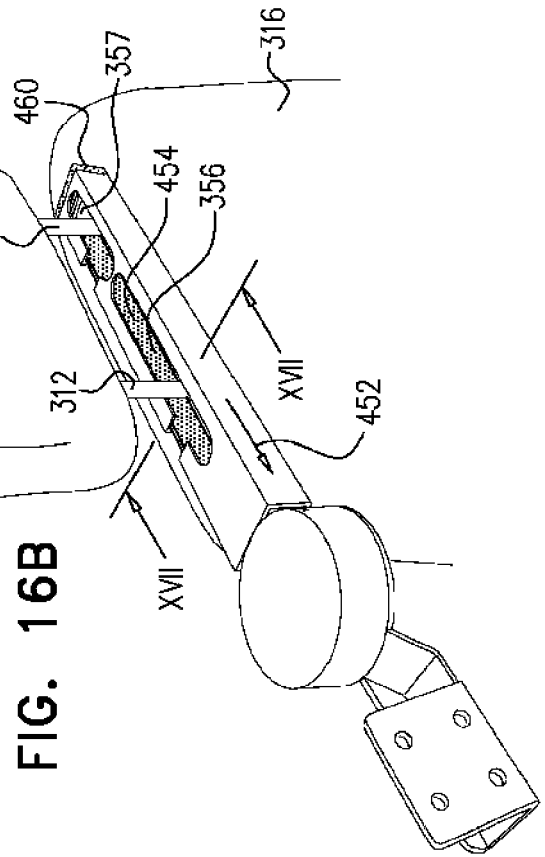
FIG. 16A
FIG. 16B

TAXI PAYMENT SYSTEM

CROSS REFERENCE TO RELATED APPLICATIONS

This application is a National Stage of International No. PCT/US2012/057360, filed Oct. 10, 2012, claiming the benefit under 35 U.S.C §119(e) of U.S. Provisional Application No. 61/547,262, filed Oct. 14, 2011, the contents of all of which are incorporated herein by reference in their entirety.

FIELD OF THE INVENTION

The present invention relates to payment systems generally and more particularly to payment systems in vehicles.

BACKGROUND OF THE INVENTION

The following patent publications are believed to represent the current state of the art:
U.S. Pat. Nos.: 6,289,315; 7,111,814 and 7,784,864; and
U.S. Patent Publication no. 2010/0243724.

SUMMARY OF THE INVENTION

The present invention seeks to provide improved payment systems in vehicles.

There is thus provided in accordance with a preferred embodiment of the present invention a taxi payment system including a point of sale device and a mounting assembly for mounting the point of sale device inside a taxi, the mounting assembly having at least two operative orientations, a first operative orientation in which the point of sale device is accessible to a taxi passenger and a second operative orientation in which the point of sale device is accessible to a taxi driver.

Preferably, the mounting assembly includes a base element including a pivot plate portion defining a generally vertical pivot axis. Additionally, the taxi payment system also includes a point of sale mounting element including a pivot plate engaging portion arranged to pivot relative to the pivot plate portion about the vertical pivot axis.

In accordance with a preferred embodiment of the present invention the point of sale mounting element is pivotable about the vertical pivot axis through an angular range extending beyond 90 degrees.

Preferably, the mounting assembly also includes a retaining element operative to retain the mounting assembly in either of the at least two operative orientations in the absence of the application of a rotation force thereto by either a taxi driver or a taxi passenger. Additionally, the retaining element is arranged for removable engagement with a selectable one of two apertures formed in the pivot plate portion, thereby to removably retain the mounting assembly in a corresponding selectable one of the at least two operative orientations.

BRIEF DESCRIPTION OF THE DRAWINGS

The present invention will be understood and appreciated more fully from the following detailed description, taken in conjunction with the drawings in which:

FIGS. 1A and 14B are simplified pictorial illustrations of a taxi payment system, constructed and operative in accordance with a preferred embodiment of the present invention, in respective first and second operative orientations;

FIGS. 2, 3, 4 and 5 are simplified pictorial illustrations of elements employed to construct a payment system mounting assembly forming part of the taxi payment system of FIGS. 1A & 1B in accordance with one embodiment of the present invention;

FIGS. 6A & 6B are simplified illustrations of a payment system mounting assembly useful in the taxi payment system of FIGS. 1A & 1B in respective assembled and partially disassembled states;

FIGS. 7A, 7B & 7C are simplified top view illustrations of the payment system of FIGS. 1A-6B in respective first, intermediate and second operative orientations;

FIGS. 8A, 8B & 8C are sectional illustrations, taken along respective section lines VIIIA-VIIIA, VIIIB-VIIIB and VIIIC-VIIIC in FIGS. 7A, 7B and 7C;

FIGS. 13A & 13B are simplified illustrations of another payment system mounting assembly useful in the taxi payment system of FIGS. 9A & 9B in respective assembled and partially disassembled states, employing the elements of FIGS. 10-12 in a first operative orientation;

FIGS. 14A & 14B are simplified illustrations of the payment system mounting assembly of FIGS. 13A & 13B in respective assembled and partially disassembled states, employing the elements of FIGS. 10-12, in a second operative orientation;

FIGS. 15A & 15B are simplified top view illustrations of the payment system of FIGS. 9A-14B in respective first and second operative orientations;

FIGS. 16A and 16B are simplified illustration of mounting of the mounting assembly of FIGS. 13A-14B onto a fixed automobile headrest.

DETAILED DESCRIPTION OF PREFERRED EMBODIMENTS

Figure 1A:
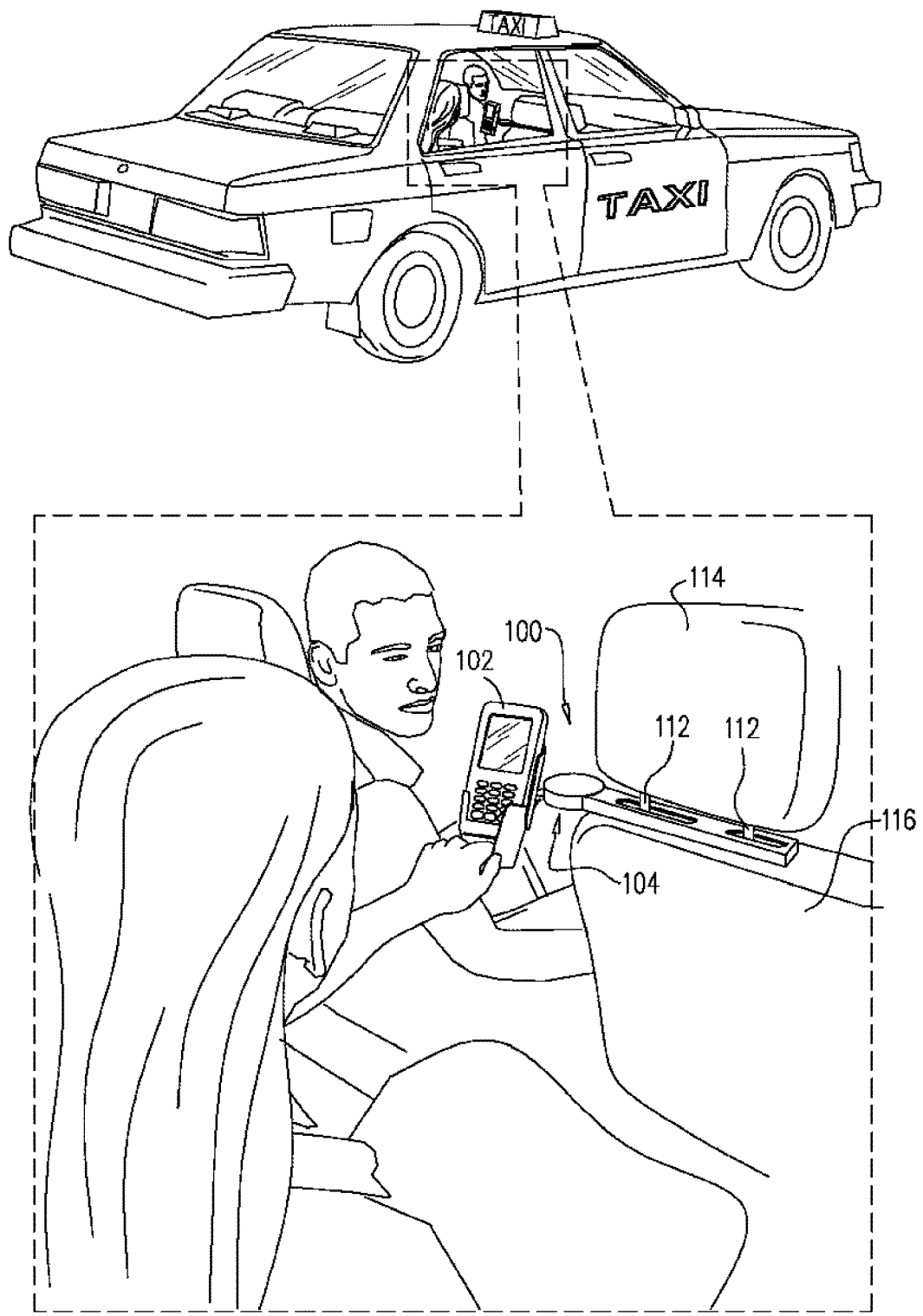
Figure 1B:
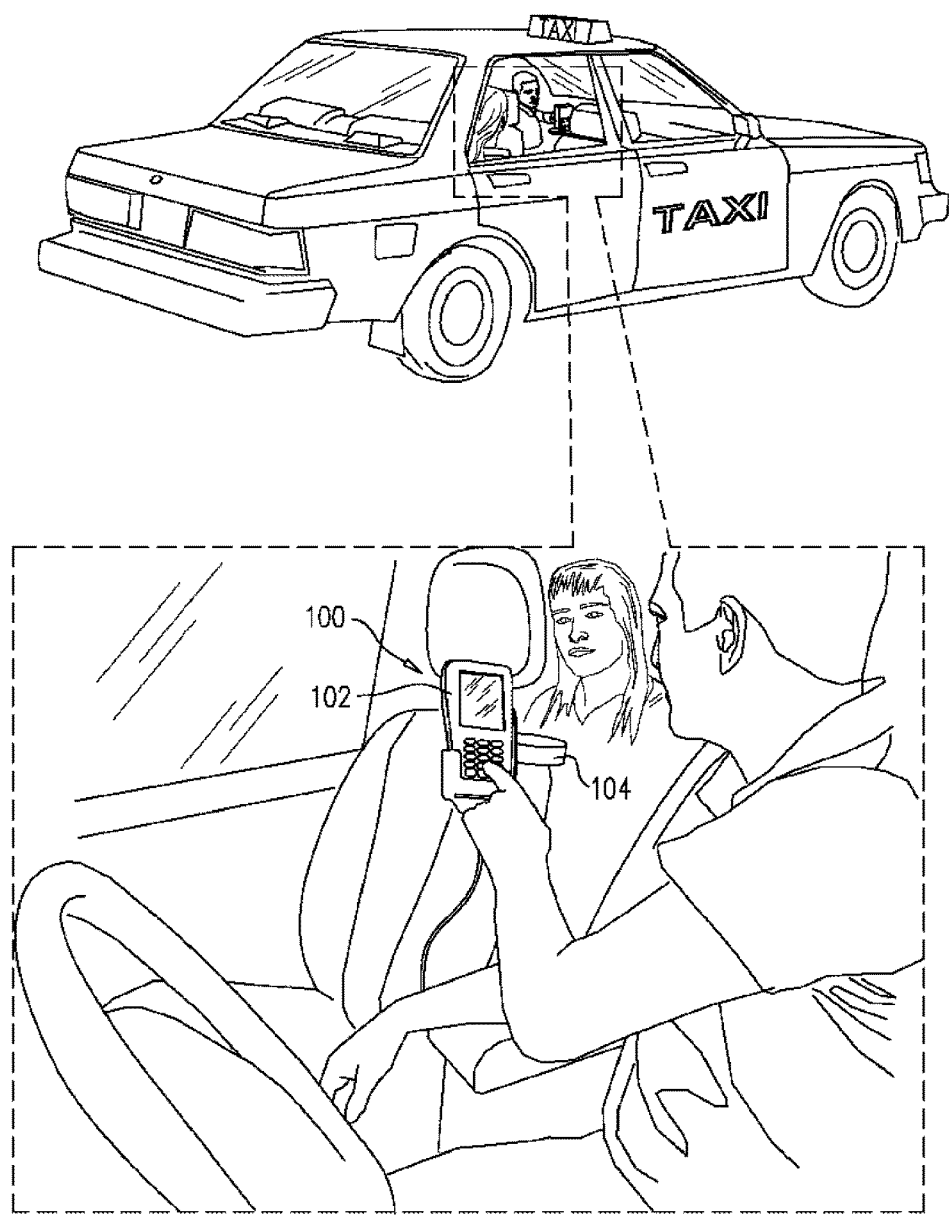

Reference is now made to FIGS. 1A and 1B, which are simplified pictorial illustrations of a taxi payment system, constructed and operative in accordance with a preferred embodiment of the present invention, in respective first and second operative orientations. As seen in FIGS. 1A and 1B, there is provided a taxi payment system 100 which includes a point of sale device/payment card acceptor, hereinafter POS, 102, which is pivotably mounted within the taxi on a mounting assembly 104. POS 102 may be any suitable POS device, preferably a VX series POS, such as a VX510, commercially available from Verifone Inc.

As seen in FIG. 1A, the taxi payment system 100 has a first operational orientation wherein the POS 102 is positioned by the mounting assembly 104 facing a passenger in a back seat of the taxi, for ease of swiping a payment card by the passenger and any other appropriate data entry.

As seen in FIG. 1B, the taxi payment system 100 has a second operational orientation, typically rotated from the first operational orientation by 100 degrees in a generally vertical plane, wherein the POS 102 is positioned by the mounting assembly 104 facing the driver of the taxi, for ease in data entry.

Reference is now made additionally to FIGS. 2-6B, which illustrate the mounting assembly 104 and its parts in accordance with one embodiment of the present invention. As seen in FIGS. 2-6B, the mounting assembly 104 includes a base element 110 (FIG. 2), arranged for mounting on headrest posts 112 which connect a headrest 114 to a forward passenger seat 116 in a taxi, as seen in FIG. 1A. A pivotable POS mounting element 120 (FIG. 3) is arranged for selectable pivotable mounting with respect to base element 110 about a generally vertical axis 122 defined by base element 110 so as to enable the payment system to selectably assume the first and second operative orientations described above. A selectable retaining element 130 (FIG. 4) engages pivotable POS mounting element 120 and base element 110 and is operative to retain the payment system in one of the first and second operative orientations unless moved by either the taxi driver or the passenger. A cover element 140 (FIG. 5) covers the mutually rotating portions of the base element 110 and the POS mounting element 120 as well as the selectable retaining element 130.

Turning now to the structure of the base element 110 as shown in FIG. 2, it is seen that base element 110 preferably comprises an elongate portion 150 having a rectangular cross section including top and bottom surfaces 152 and 154, both having corresponding apertures 156 and 158 for accommodating headrest posts 112 (FIG. 1A). An integrally formed pivot plate portion 160 extends axially from elongate portion 150 and is formed with a central pin receiving aperture 162 defining vertical axis 122 and a pair of mutually circumferentially spaced retaining element receiving apertures 164 and 166, radially outward therefrom. Pivot plate portion 160 includes a pair of shoulders 168 and 170 which define rotation stops for pivotable POS mounting element 120.

Turning now to FIG. 3, it is seen that POS mounting element 120 is preferably integrally formed and preferably includes an inclined POS mounting plate portion 180 having apertures 182 for mounting thereon of a suitable POS device. Mounting plate portion 180 preferably extends upwardly and rearwardly from a base portion 184 which terminates rearwardly in an upstanding portion 186.

Base portion 184 extends to an inclined intermediate portion 188, which terminates in a pivot plate engaging portion 190. Pivot plate engaging portion 190 is formed with a pivot aperture 192, arranged to be coaxial with aperture 162 of base element 110 along vertical axis 122, and a retaining element receiving aperture 194. A retaining element engagement plate portion 196 overlies part of pivot plate engaging portion 190 at aperture 194 and extends generally parallel to pivot plate engaging portion 190 from an upstanding support portion 198.

As seen in FIG. 4, selectable retaining element 130 is preferably formed of spring steel or a similar material and is generally formed as a bent over strip 202 which includes an upwardly inclined top portion 204, a generally flat portion 206, an intermediate portion 208 and a bottom generally flat portion 210, having a downwardly extending finger portion 212, arranged to extend through aperture 194 and to selectably engage one of mutually circumferentially spaced retaining element receiving apertures 164 and 166 depending on the operative orientation of the payment system of FIGS. 1A and 1B.

Cover element 140, shown in FIG. 5, preferably is a cap of circular cross section including a disc shaped top portion 220 having a depending cylindrical wall 222.

Reference is now made to FIGS. 7A-8C, which illustrate the payment system of FIGS. 1-6B in respective first, intermediate and second operative orientations. As seen in FIGS. 7A-8C, the POS mounting element 120 is pivotably mounted onto the base element 110 by means of a pin 224, such as a rivet, and retaining element 130 is retained by retaining element engagement plate portion 196 against pin 224 in a somewhat compressed state, so as to retain finger portion 212 in aperture 194 of POS mounting element 120 and to urge finger portion 212 against pivot plate portion 160 and into one of apertures 164 and 166 of base element 110 when the relative rotational position of the POS mounting element 120 relative to the pivot plate portion 160 is such that the payment system is in one of the first and second operative orientations shown in FIGS. 1A and 1B. It is appreciated that engagement of finger portion 212 in apertures 164 or 166 serves to retain the payment system 100 in a respective operative orientation unless the POS is rotated by the taxi driver or passenger about axis 122.

Turning now specifically to FIGS. 7A & 8A, which show the payment system 100 in the first operative orientation, it is seen that finger portion 212 engages aperture 164 of the pivot plate portion 160 under urging of the retaining element 130. In this operative orientation, as seen particularly in FIG. 6B, one edge of inclined portion 188 of the POS mounting element 120 engages shoulder 168 of pivot plate portion 160 of base element 110, which acts as a rotation stop.

Turning now to FIGS. 7B and 8B, it is seen that rotation of the POS mounting element 120 about axis 122 as by the passenger or the driver, in a direction indicated by an arrow 230 in FIG. 7B, causes finger portion 212 to pop out of aperture 164, against the urging of the retaining element 130.

Turning now to FIGS. 7C and 8C, it is seen that further rotation of the POS mounting element 120 about axis 122 in the direction indicated by arrow 230 brings the payment system 100 to the second operative orientation, shown in FIGS. 1B, 7C and 8C. It is seen that when the payment system 100 is in the second operative orientation, finger portion 212 engages aperture 166 of the pivot plate portion 160, under urging of the retaining element 130. In this operative orientation, an opposite edge of inclined portion 188 of the POS mounting element 120 engages shoulder 170 of pivot plate portion 160 of base element 110, which acts as a rotation stop.

Figure 9A:
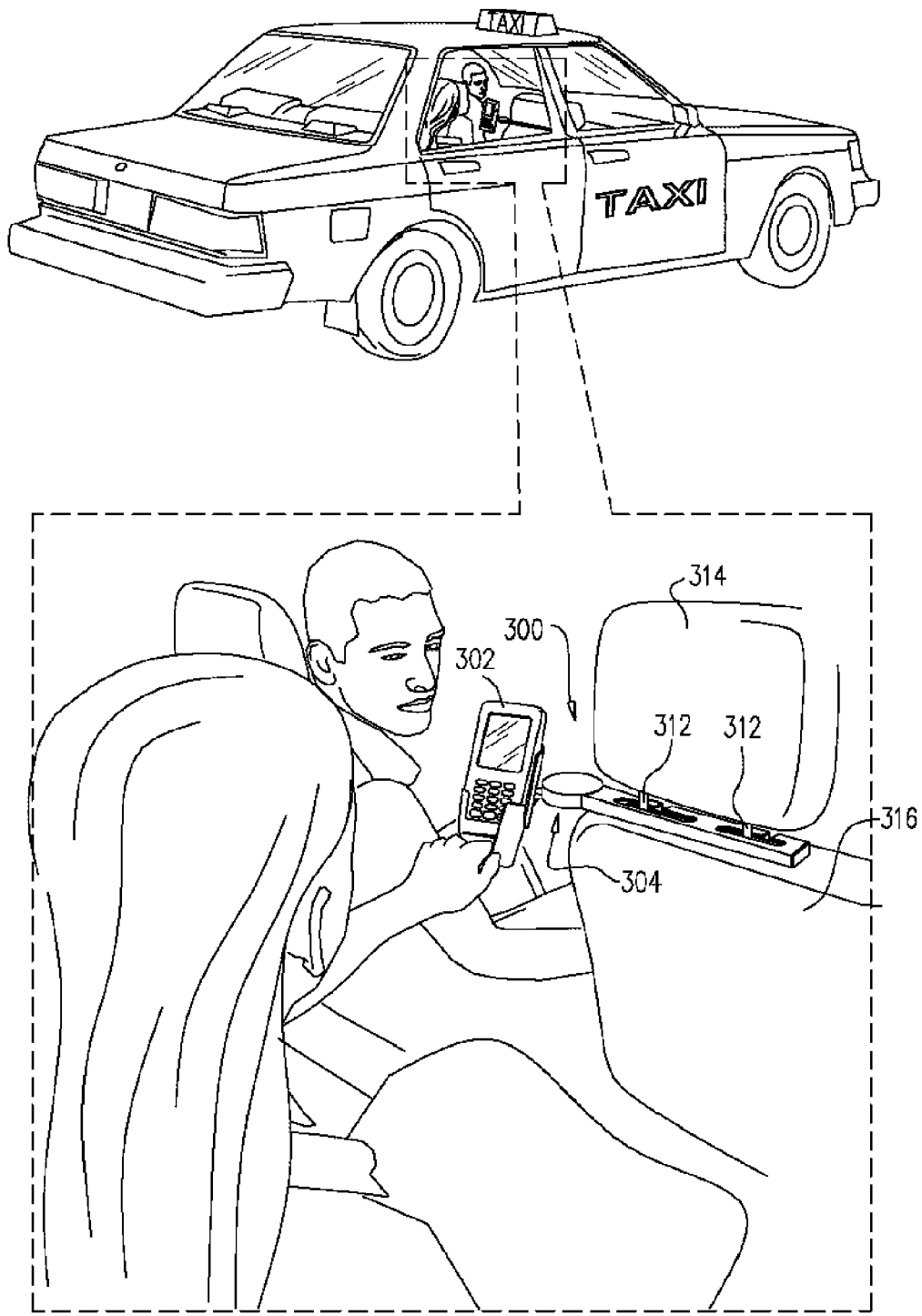
FIGS. 9A and 9B are simplified pictorial illustrations of a taxi payment system, constructed and operative in accordance with another preferred embodiment of the present invention, in respective first and second operative orientations.
Figure 9B:
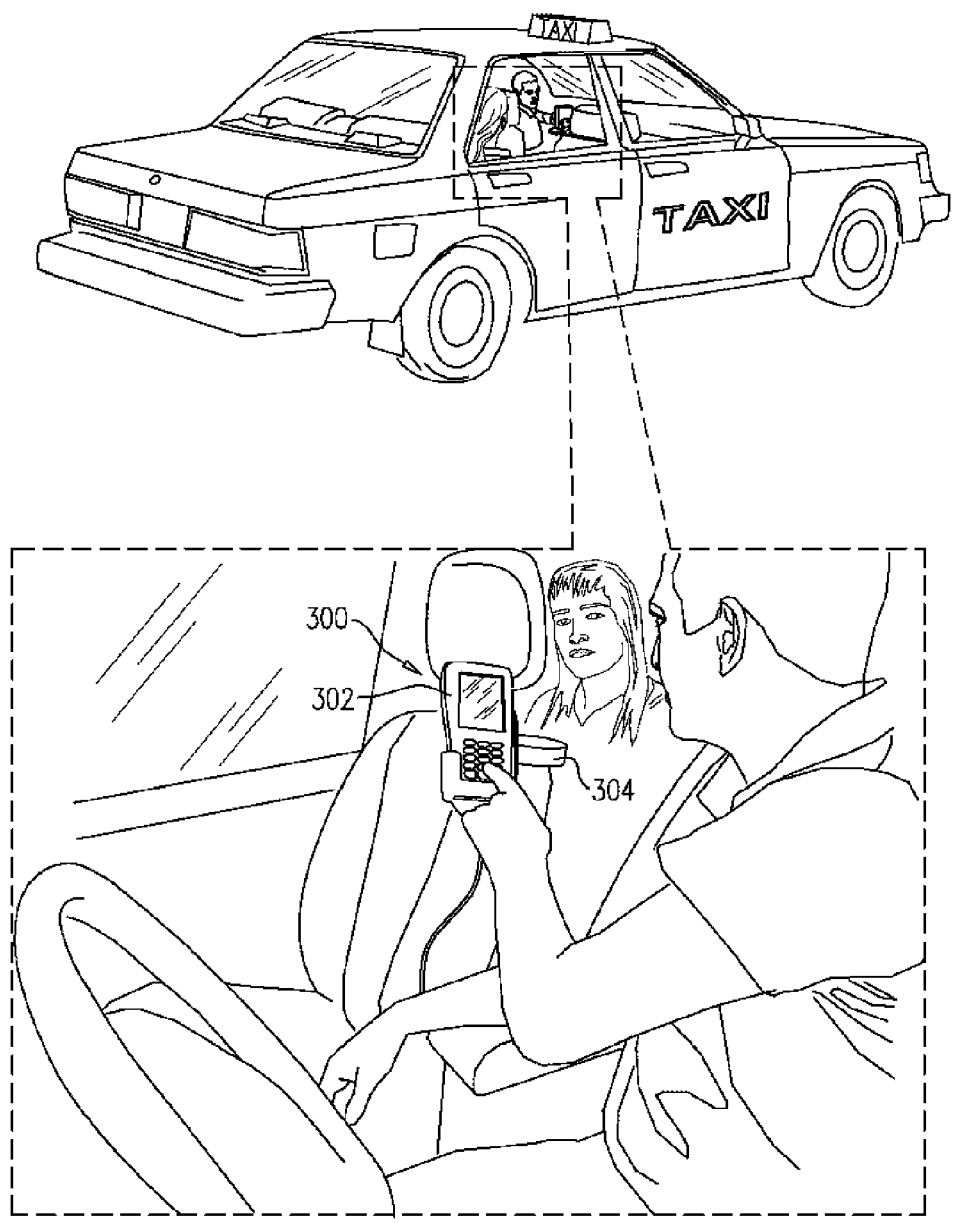

Reference is now made to FIGS. 9A and 9B, which are simplified pictorial illustrations of a taxi payment system, constructed and operative in accordance with another preferred embodiment of the present invention, in respective first and second operative orientations. As seen in FIGS. 9A and 9B, there is provided a taxi payment system 300 which includes a point of sale device/payment card acceptor, hereinafter POS, 302, which is pivotably mounted within the taxi on a mounting assembly 304. POS 302 may be any suitable POS device, preferably a VX series POS, such as a VX510, commercially available from Verifone Inc.

As seen in FIG. 9A, the taxi payment system 300 has a first operational orientation wherein the POS 302 is positioned by the mounting assembly 304 facing a passenger in a back seat of the taxi, for ease of swiping a payment card by the passenger and any other appropriate data entry.

As seen in FIG. 9B, the taxi payment system 300 has a second operational orientation, typically rotated from the first operational orientation by 100 degrees in a generally vertical plane, wherein the POS 302 is positioned by the mounting assembly 304 facing the driver of the taxi, for ease in data entry.

Reference is now made additionally to FIGS. 10-17B, which illustrate the mounting assembly 304 and its parts in accordance with another embodiment of the present invention. As seen in FIGS. 10-17B, the mounting assembly 304 includes a base element 310 (FIG. 10) arranged for mounting on headrest posts 312 which fixedly connect a headrest 314 to a forward passenger seat 316 in a taxi, as seen in FIG. 9A.

A pivotable POS mounting element 320 (FIG. 11) is arranged for selectable pivotable mounting with respect to base element 310 about a generally vertical axis 322 defined by base element 310 so as to enable the payment system to selectably assume the first and second operative orientations described above. A cover element 340 (FIG. 12) covers the mutually rotating portions of the base element 310 and the POS mounting element 320.

Figure 10:
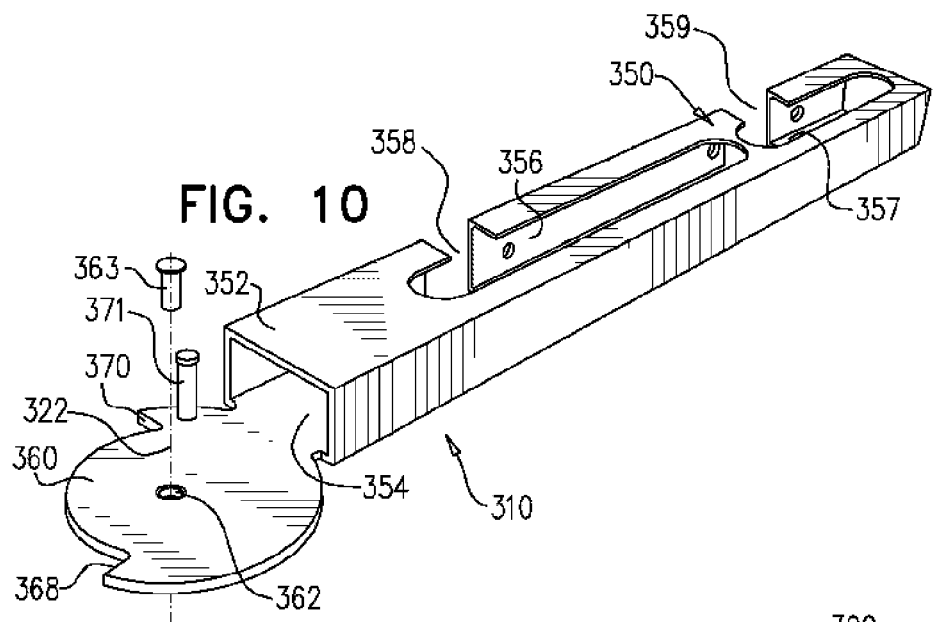
FIGS. 10, 11 and 12 are simplified pictorial illustrations of elements employed to construct a payment system mounting assembly forming part of the taxi payment system of FIGS. 9A & 9B in accordance with another embodiment of the present invention.

Turning now to the structure of the base element 310 as shown in FIG. 10, it is seen that base element 310 preferably comprises an elongate portion 350 having a rectangular cross section including top and bottom surfaces 352 and 354, both having corresponding apertures 356 and 357 for accommodating headrest posts 312 (FIG. 9A). Two mutually spaced side cut-outs 358 and 359 are formed in a side wall of elongate portion 350 and communicate with respective apertures 356 and 357 formed therein, in order to permit side mounting of the base element 310 on headrest posts 312 which fixedly attach the headrest 314 to passenger seat 316.

An integrally formed pivot plate portion 360 extends axially from elongate portion 350 and is formed with a central pin receiving aperture 362 defining vertical axis 322 and being configured to receive a pivot pin 363. Pivot plate portion 360 includes a pair of shoulders 368 and 370 which define rotation stops for pivotable POS mounting element 320. A spring mounting post 371 is fixed to plate portion 360 just behind shoulder 370.

Figure 11:
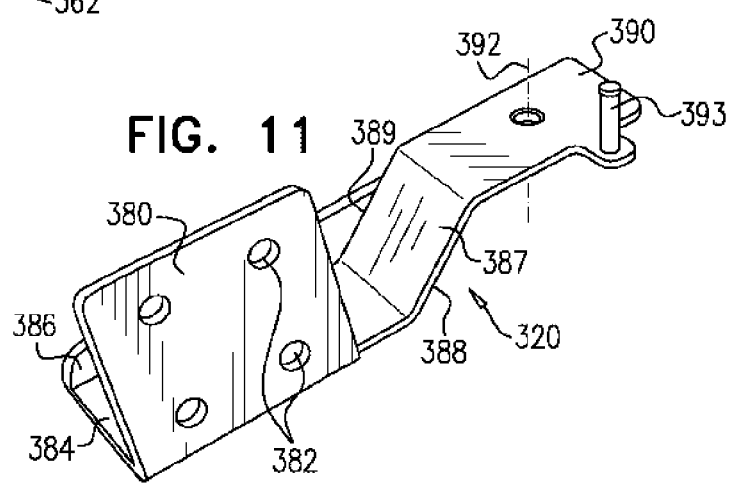

Turning now to FIG. 11, it is seen that POS mounting element 320 is preferably integrally formed and preferably includes an inclined POS mounting plate portion 380 having apertures 382 for mounting thereon of a suitable POS device (not shown). Mounting plate portion 380 preferably extends upwardly and rearwardly from a base portion 384, which terminates rearwardly in an upstanding portion 386.

Base portion 384 extends to an inclined intermediate portion 387 having opposite edges 388 and 389, which terminates in a pivot plate engaging portion 390. Pivot plate engaging portion 390 is formed with a pivot aperture 392, arranged to be coaxial with aperture 362 of base element 310 along vertical axis 322 and to be engaged by pivot pin 363. A spring mounting post 393 is fixedly mounted to pivot plate engaging portion 390.

Figure 12:
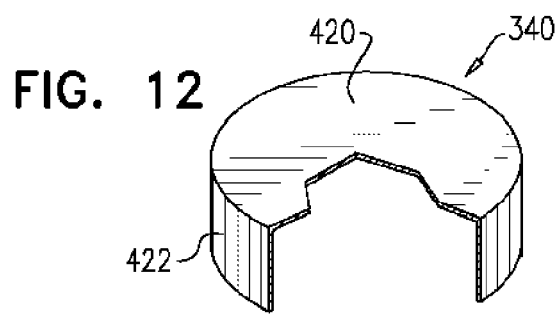
Figure 17A:
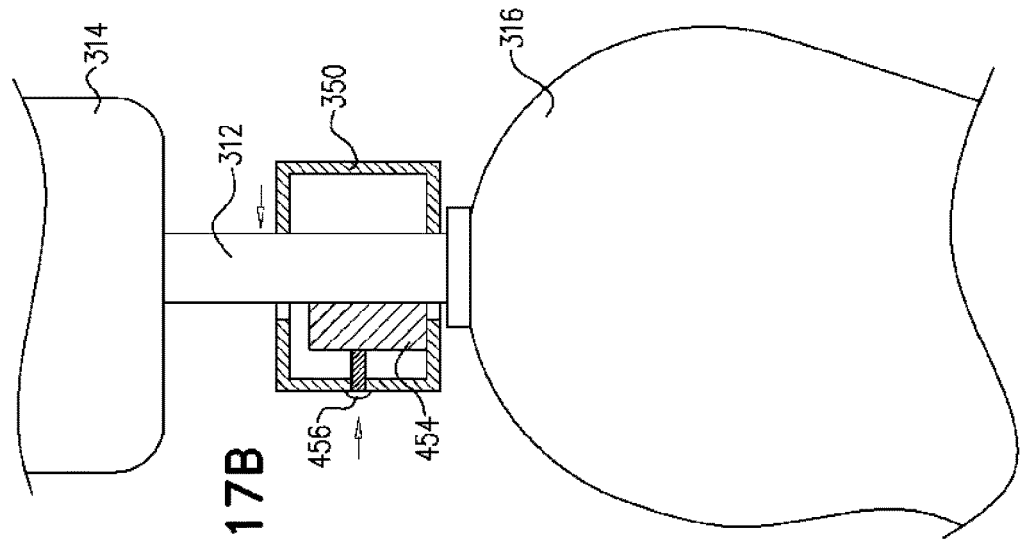
FIGS. 17A and 17B are sectional illustrations, taken along the line XVII-XVII in FIG. 16B, showing pre-tightened and tightened states of the mounting assembly of FIGS. 13A-14B onto headrest posts which fixedly attach a headrest to a forward passenger seat.
Figure 17B:
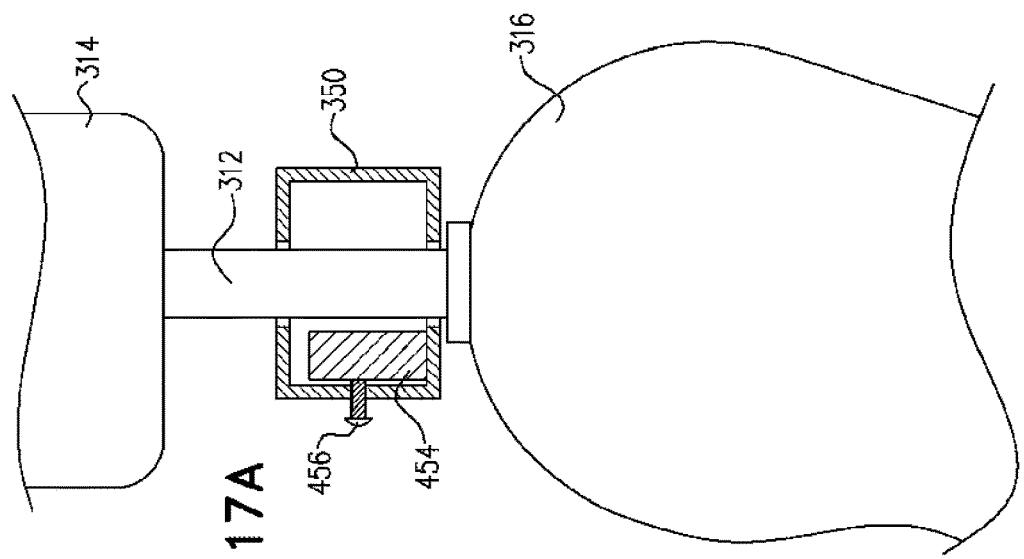

Cover element 340, shown in FIG. 12, preferably is a cap of circular cross section including a disc shaped top portion 420 having a depending cylindrical wall 422. Reference is now made to FIGS. 13A-15B, which illustrate the payment system of FIGS. 9A-12 in respective first and second operative orientations.

As seen, the POS mounting element 320 is pivotably mounted onto the base element 310 by means of pin 363, such as a rivet. An over-center spring arrangement retains the payment system in the first and second operative orientations and preferably includes a tension spring 425, which extends between spring mounting posts 371 and 393. It is appreciated that tension spring 425 serves to retain the payment system 300 in a given operative orientation unless the POS is rotated by the taxi driver or passenger about axis 322.

Turning now specifically to FIGS. 13A & 13B, which show the payment system 300 in the first operative orientation shown in FIGS. 9A and 15A, it is seen that, as seen particularly in FIG. 13B, edge 388 of inclined portion 387 of the POS mounting element 320 engages shoulder 368 of pivot plate portion 360 of base element 310, which acts as a rotation stop.

Turning now to FIGS. 14A and 14B, which show the payment system 300 in the second operative orientation shown in FIGS. 9B & 15B, it is seen that rotation of the POS mounting element 320 about axis 322 as by the passenger or the driver, in a direction indicated by an arrow 430 in FIG. 14B, the operation of spring 425 causes edge 389 (FIG. 11) of inclined portion 388 (FIG. 11) of the POS mounting element 320 to engage shoulder 370 (FIG. 10) of pivot plate portion 360 of base element 310, which acts as a rotation stop.

Reference is now made to FIGS. 16A-17B, which illustrate mounting of the payment system 300 onto headrest posts 312 which fixedly mount a headrest 314 onto a forward passenger seat 316. It is seen that elongate element 350 is mounted onto headrest posts 312 from behind, as indicated by arrows 450, with the headrest posts 312 initially passing through the cut outs 358 and 359. Thereafter, the elongate element 350 is shifted axially, as indicated by an arrow 452, with the headrest posts 312 being located in apertures 356 and 357. Thereafter, as seen most clearly in FIGS. 17A & 17B, a spacer element 454 is tightened between elongate element 350 and headrest posts 312 by means of tightening screws 456, which extend through threaded holes 458 (FIG. 17A) formed in elongate element 350. Finally, an end cap 460 is fitted into an open end 462 of elongate element 350

It will be appreciated by persons skilled in the art that the present invention is not limited to what has been particularly shown and described hereinabove. Rather the scope of the invention includes both combinations and subcombinations of the various features described hereinabove as well as modifications and variations thereof which would occur to persons skilled in the art upon reading the foregoing description and which are not in the prior art.

The invention claimed is:

1. A mounting assembly for a point of sale device in a taxi comprising:
   a point of sale device; and
   a mounting assembly for mounting said point of sale device inside a taxi, said mounting assembly having at least two operative orientations comprising:
   a first operative orientation in which said point of sale device is facing a back of said taxi and is accessible to a taxi passenger and a second operative orientation in which said point of sale device is rotated by at least 90 degrees from said first operative orientation to face a taxi driver and is accessible to said taxi driver.

2. The mounting assembly for a point of sale device in a taxi according to claim 1, said mounting assembly comprising a base element including a pivot plate portion defining a generally vertical pivot axis.

3. The mounting assembly for a point of sale device in a taxi according to claim 2, further comprising a point of sale mounting element including a pivot plate engaging portion configured to pivot relative to said pivot plate portion about said vertical pivot axis.

4. The mounting assembly for a point of sale device in a taxi according to claim 3, wherein said point of sale mounting element is pivotable about said vertical pivot axis through an angular range extending beyond 90 degrees.

5. The mounting assembly for a point of sale device in a taxi according to claim 1, said mounting assembly comprising a retaining element that is operative to retain said mounting assembly in either of said at least two operative orientations in the absence of the application of a rotation force thereto by either the taxi driver or the taxi passenger.

6. The mounting assembly for a point of sale device in a taxi according to claim 5, wherein said retaining element is configured for removable engagement with a selectable one of two apertures formed in a pivot plate portion, thereby to removably retain said mounting assembly in a corresponding selectable one of said at least two operative orientations.

7. The mounting assembly for a point of sale device in a taxi according to claim 5, said retaining element comprising an over-center spring arrangement including a tension spring having a first end thereof mounted on a first portion of said mounting assembly and a second end thereof mounted on a second portion of said mounting assembly and the second end is rotatable relative to said first portion.

8. The mounting assembly for a point of sale device in a taxi according to claim 1, said mounting assembly comprising a headrest post mounting portion for mounting onto headrest posts of a vehicle passenger seat.

9. The mounting assembly for a point of sale device in a taxi according to claim 8, said headrest post mounting portion comprising an elongate element having apertures extending therethrough for accommodating said headrest posts.

10. The mounting assembly for a point of sale device in a taxi according to claim 9, said elongate element comprising a pair of side cut-outs communicating with said apertures, thereby enabling side mounting of said elongate element onto said headrest posts without requiring removal of a headrest attached thereto.

11. The mounting assembly for a point of sale device in a taxi according to claim 2, said mounting assembly further comprising a retaining element that is operative to retain said mounting assembly in either of said at least two operative orientations in the absence of the application of a rotation force thereto by either the taxi driver or the taxi passenger.

12. The mounting assembly for a point of sale device in a taxi according to claim 3, said mounting assembly further comprising a retaining element that is operative to retain said mounting assembly in either of said at least two operative orientations in the absence of the application of a rotation force thereto by either a taxi driver or a taxi passenger.

13. The mounting assembly for a point of sale device in a taxi according to claim 4, said mounting assembly further comprising a retaining element that is operative to retain said mounting assembly in either of said at least two operative orientations in the absence of the application of a rotation force thereto by either the taxi driver or the taxi passenger.

14. The mounting assembly for a point of sale device in a taxi according to claim 11, said retaining element comprising an over-center spring arrangement including a tension spring having a first end thereof mounted on a first portion of said mounting assembly and a second end thereof mounted on a second portion of said mounting assembly, which second end is rotatable relative to said first portion.

15. The mounting assembly for a point of sale device in a taxi according to claim 12, said retaining element comprising an over-center spring arrangement including a tension spring having a first end thereof mounted on a first portion of said mounting assembly and a second end thereof mounted on a second portion of said mounting assembly, which second end is rotatable relative to said first portion.

16. The mounting assembly for a point of sale device in a taxi according to claim 13, said retaining element comprising an over-center spring arrangement including a tension spring having a first end thereof mounted on a first portion of said mounting assembly and a second end thereof mounted on a second portion of said mounting assembly, which second end is rotatable relative to said first portion.

17. The mounting assembly for a point of sale device in a taxi according to claim 2, said mounting assembly comprising a headrest post mounting portion for mounting onto headrest posts of a vehicle passenger seat.

18. The mounting assembly for a point of sale device in a taxi according to claim 3, said mounting assembly comprising a headrest post mounting portion for mounting onto headrest posts of a vehicle passenger seat.

19. The mounting assembly for a point of sale device in a taxi according to claim 4, said mounting assembly further comprising a headrest post mounting portion for mounting onto headrest posts of a vehicle passenger seat.

20. The mounting assembly for a point of sale device in a taxi according to claim 5, said mounting assembly further comprising a headrest post mounting portion for mounting onto headrest posts of a vehicle passenger seat.

* * * * *